United States Patent
Li et al.

(10) Patent No.: US 11,898,253 B2
(45) Date of Patent: Feb. 13, 2024

(54) PROCESS FOR PRODUCING TINNED COPPER WIRES

(71) Applicant: Jiangxi Advanced Copper Industry Research Inst, Jiangxi Province (CN)

(72) Inventors: Mingmao Li, Jiangxi Province (CN); Shijun Tang, Jiangxi Province (CN); Shihong Tang, Jiangxi Province (CN); Mingbiao Zhu, Jiangxi Province (CN); Wenjing Wang, Jiangxi Province (CN)

(73) Assignee: JIANGXI ADVANCED COPPER INDUSTRY RESEARCH INSTITUTE

( * ) Notice: Subject to any disclaimer, the term of this patent is extended or adjusted under 35 U.S.C. 154(b) by 47 days.

(21) Appl. No.: 17/301,240

(22) Filed: Mar. 30, 2021

(65) Prior Publication Data

US 2021/0310111 A1    Oct. 7, 2021

(30) Foreign Application Priority Data

Apr. 2, 2020 (CN) .......................... 202010255916.7

(51) Int. Cl.
*C23C 4/08* (2016.01)
*C23C 4/123* (2016.01)
(Continued)

(52) U.S. Cl.
CPC ............ *C23C 4/08* (2013.01); *B23K 35/0227* (2013.01); *B23K 35/302* (2013.01);
(Continued)

(58) Field of Classification Search
CPC .. C23C 4/08; C23C 4/123; C23C 4/16; C23C 4/18; C23C 2/02; C23C 2/08; C23C 2/28;
(Continued)

(56) References Cited

U.S. PATENT DOCUMENTS 3,642,523 A * 2/1972 Schreiner ................. C23C 2/08
427/374.2
4,014,660 A * 3/1977 Schreiner ................. C23C 2/08
228/904
(Continued)

FOREIGN PATENT DOCUMENTS

| CN | 1337474 A | 2/2002 |
| CN | 102660723 A | 9/2012 |
| GB | 2431412 A * | 4/2007 ............. C22C 13/00 |

OTHER PUBLICATIONS

Song, Production Process of Hot Tinned Round Copper Wire, 2010, Optical fiber & Electric Cable, No. 5, p. 32-35 (Year: 2010).*

(Continued)

*Primary Examiner* — Dah-Wei D. Yuan
*Assistant Examiner* — Nga Leung V Law
(74) *Attorney, Agent, or Firm* — DINSMORE & SHOHL LLP

(57) ABSTRACT

Provided is a process for producing a tinned copper wire. The process comprises subjecting a copper wire sequentially to activation treatment, a first hot tinning treatment, a first cooling, a second hot tinning treatment, and a second cooling to obtain a tinned copper wire. The first hot tinning treatment is carried out at a first temperature and the second hot tinning treatment is carried out at a second temperature. The first temperature is higher than the second temperature. The first temperature is at least 38° C. higher than the melting point of tin. The second temperature is at least 8° C. higher than the melting point of tin.

6 Claims, 1 Drawing Sheet

(51) Int. Cl.
*B23K 35/02* (2006.01)
*B23K 35/30* (2006.01)
*B23K 35/362* (2006.01)
*C23C 4/16* (2016.01)
*C23C 4/18* (2006.01)
*B23K 101/32* (2006.01)
*B23K 103/12* (2006.01)
*B23K 101/34* (2006.01)

(52) U.S. Cl.
CPC ............ *B23K 35/362* (2013.01); *C23C 4/123* (2016.01); *C23C 4/16* (2013.01); *C23C 4/18* (2013.01); *B23K 2101/32* (2018.08); *B23K 2101/34* (2018.08); *B23K 2103/12* (2018.08)

(58) Field of Classification Search
CPC .... C23C 2/38; B23K 35/0227; B23K 35/302; B23K 35/362; B23K 2101/32; B23K 2101/34; B23K 2103/12
See application file for complete search history.

(56) References Cited

U.S. PATENT DOCUMENTS

2001/0041226 A1* 11/2001 Elbern ...................... C23C 2/00
427/431
2003/0089432 A1* 5/2003 Carey, II ............... C23C 28/025
148/527

OTHER PUBLICATIONS

CN Application No. 2020102559167 First Office Action in Chinese with English Translation dated Jun. 30, 2021, 16 pages.
CN Application No. 2020102559167 Second Office Action in Chinese with English Translation dated Aug. 12, 2021, 10 pages.
CN Application No. 2020102559167 Third Office Action in Chinese with English Translation dated Oct. 22, 2021, 12 pages.
Discussion on the production process of round copper wire hot tinning, Song Mingming, etc., Optical fiber and cable and its application technology, No. 5, pp. 32-35, 2010-12-31).

\* cited by examiner

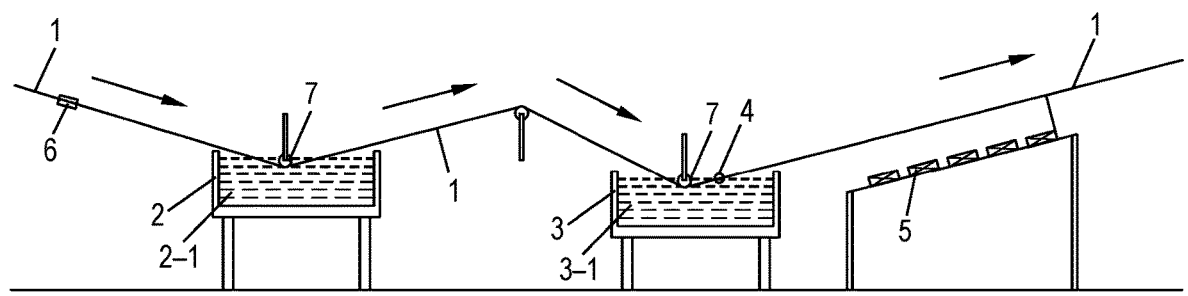

PROCESS FOR PRODUCING TINNED COPPER WIRES

CROSS-REFERENCE TO RELATED APPLICATIONS

This application claims priority to and the benefit of Chinese Patent Application No. 202010255916.7, titled "Production process of tinned copper wire," filed Apr. 2, 2020, the entire disclosure of which is hereby incorporated herein by reference.

TECHNICAL FIELD

The present application belongs to the technical field of tinning and preparation, and particularly relates to a process for producing a tinned copper wire.

BACKGROUND OF THE DISCLOSURE

Tinning on the surface of copper wire can greatly improve the corrosion resistance and oxidation resistance of the copper wire, and allow the copper conductor to have solderability. Copper conductor is a basic material in the electronics industry and is suitable for the production of electronic components leads and jumper wire of complete circuit boards. With the continuous development of electronic component and equipment towards the direction of miniaturization, microminiaturization, and high integration, and continuous development of electronic packaging technology towards the direction of automation and high efficiency, the performance requirements of products such as tinned copper wires are getting higher and higher.

Tinned round copper wires are generally produced by hot tinning method, wherein a bare copper wire is continuously and quickly passed through a molten tin tank so that liquid tin adheres to the surface of the copper wire and then is cooled and solidified in the air to complete the continuous tinning. The process of hot tinning on the copper wire is essentially a process of wetting and diffusion, and it is also a process of flowing and crystallizing of the tin liquid to be solidified onto the surface of the copper wire when the copper wire leaves the tin tank. Therefore, bare copper wire, tin melt, and hot tinning method production process have great impacts on the performance of the product. On the one hand, there are often oil stains, water stains, oxidation phenomena on the surface of copper wires, which will result in failure of coating of tin on local surface of copper wires or insufficient thickness and density of the coating. Although the copper wires will undergo surface activation treatment before hot tinning, defects on the surface of the copper wires are not completely eliminated, and thus problems such as "thin coating" and "skip coating" would occur, such that bare copper is not protected well by the tin coating. On the other hand, copper atoms diffuse into the tin liquid when copper wire is being hot tinning in the tin liquid, so with the prolongation of production time, the concentration of copper atoms in the tin bank will increase significantly after a period of time, and the melting point and viscosity of the tin liquid are thus increased, thereby reducing the wettability between the tin liquid and the copper wire and bring problems such as "thin coating" and "skip coating". In addition, the problems such as "thin coating" and "skip coating" will reduce the heat resistance and salt spray resistance of the tinned copper wire, making it unable to meet the requirements of electronic components.

In addition, tinned round lead wires used in electronic components are often large in size, and thus the tinning layer is required to have a certain thickness. However, it is difficult to ensure the uniformity of a thicker tin layer on the copper wire with the existing hot tinning processes. In order to solve the above problems, researchers have made various attempts, for example, to change the compositions of the tin layer and the flux, and increase the temperature of hot tinning, etc., which bring some improvements to the tin layer of tinned round copper wires to a certain extent, but the effects are tiny because the above-mentioned fundamental problems cannot be fully solved.

SUMMARY OF THE DISCLOSURE

Therefore, the present application provides a process for producing a tinned copper wire, in order to solve the problems in the prior art that tinned copper wires obtained with existing methods have reduced heat resistance and salt spray resistance due to "thin coating" and "skip coating" on the surface of the tinned copper wires and that the tin coating has uneven thickness.

For this purpose, the present application provides the following technical solutions.

In one aspect, the present application provides a process for producing a tinned copper wire, comprising:

subjecting a copper wire sequentially to activation treatment, a first hot tinning treatment, a first cooling, a second hot tinning treatment, and a second cooling to obtain a tinned copper wire;

wherein the first hot tinning treatment is carried out at a first temperature and the second hot tinning treatment is carried out at a second temperature, and wherein the first temperature is higher than the second temperature; and wherein the first temperature is at least 38° C. higher than the melting point of tin; and the second temperature is at least 8° C. higher than the melting point of tin.

Preferably, the first hot tinning treatment is carried out at a temperature of 270° C. to 320° C.; and the second hot tinning treatment is carried out at a temperature of 240° C. to 245° C.

Preferably, the second hot tinning treatment is carried out with a molten tin liquid comprising a rare metal in an amount of less than or equal to 0.1 wt %, for example, 0.05 wt % to 0.1 wt %, and more preferably 0.05 wt % to 0.08 wt %.

Preferably, the rare metal is at least one of indium, bismuth, and nickel.

Preferably, the first hot tinning treatment is carried out with a molten tin liquid comprising copper in an amount of less than or equal to 0.7 wt %.

Preferably, the molten tin liquid for the second hot tinning treatment comprises copper in an amount of less than or equal to 2.0 wt %.

Preferably, the second cooling is carried out by a wind cooling method, preferably at a wind speed of 10-15 meters per second (m/s) with a wind direction that is perpendicular to the copper wire.

Further preferably, the copper wire is conveyed at a speed of 150-400 meters per minute (m/min) during the process.

Preferably, the copper wire is conveyed at a speed of 150-200 m/min when the copper wire has a diameter of greater than 0.8 millimeters (mm).

Preferably, the copper wire is conveyed at a speed of 300-400 m/min when the copper wire has a diameter of less than 0.1 mm.

Preferably, the copper wire is conveyed at a speed of 200-300 m/min when the copper wire has a diameter of 0.1-0.8 mm.

Furthermore preferably, the activation treatment comprises activating the copper wire with a flux.

Preferably, the copper wire has a cooling length of 1 meter (m) to 1.5 m in the first cooling.

Preferably, the molten tin liquid for the first hot tinning treatment comprises phosphorus in an amount of 0.01-0.1 wt %.

Preferably, the first cooling is an air cooling method, which means that the copper wire is exposed in natural air between the first hot tinning furnace and the second hot tinning furnace such that the copper wire is cooled at room temperature. This method can ensure that the copper wire will not be cooled to a too low temperature, and still has a certain temperature when it enters the second hot tinning furnace.

Preferably, there is no mold in the first hot tinning furnace. Preferably a mold is provided at a position where the copper wire leaves the molten tin liquid in the second hot tinning furnace, such that when the copper wire leaves the molten tin liquid in the second hot tinning furnace, fresh tin liquid will cover up skip coating points if present on the surface of the copper wire, thereby forming dense tin coating layer.

Preferably, the flux is a weak acidic flux or a neutral flux.

The present application has the following advantages:

1. The process for producing a tinned copper wire provided by the present application comprises subjecting a copper wire sequentially to activation treatment, a first hot tinning treatment, a first cooling, a second hot tinning treatment, and a second cooling to obtain a tinned copper wire; wherein the first hot tinning treatment is carried out at a first temperature and the second hot tinning treatment is carried out at a second temperature, and wherein the first temperature is higher than the second temperature; and wherein the first temperature is at least 38° C. higher than the melting point of tin; and the second temperature is at least 8° C. higher than the melting point of tin. Since the first temperature for the first hot tinning treatment is higher than the second temperature for the second hot tinning treatment and is at least 38° C. higher than the melting point of tin, the molten tin liquid in the first hot tinning treatment can have good fluidity, so that the wettability between the molten tin liquid and the copper wire is good, thereby reducing occurrence of "skip coating". Further, on the basis of the first hot tinning treatment, a second hot tinning treatment is carried out at a second temperature which is lower than the first temperature for the first hot tinning treatment but is at least 8° C. higher than the melting point of tin, so that the molten tin liquid in the second hot tinning treatment is easier to coat onto the copper wire. Skip coating points if generated in the first hot tinning treatment will be "covered up" during the second hot tinning treatment, thereby avoiding occurrence of "skip coating" on the copper wire. Since the second temperature for the second hot tinning treatment is lower than the first temperature for the first hot tinning treatment, the tinned copper wire is not easy to be oxidized, and the surface of the product is brighter. The production process of the tinned copper wire comprises two tinning processes, that is, a further layer of tin is coated on the surface of the first tinned layer, and the two tinned layers are tightly combined, thereby obtaining an ultra-thick tin layer with a smooth and flat surface. In this way, the copper wire is ensured to have a tin layer with good uniformity, and there are no occurrence of "skip coating" and "thin coating", so that the copper wire has better heat resistance and salt spray resistance. Meanwhile, since second temperature is lower than the first temperature, the tin layer already coated on the copper wire can be prevented from excessive re-melting during the second hot tinning treatment.

2. In a preferred embodiment of the present application, the first hot tinning treatment is carried out with a molten tin liquid having a temperature of 270° C. to 320° C., which is higher than the melting point, 231.89° C., of tin, so that it can fully ensure that the molten tin liquid has a better fluidity, thereby avoiding the problem of excessively high viscosity of the molten tin liquid. When the copper wire is immersed in the molten tin liquid, it can be better wetted to ensure that the coating has integrity and uniformity. The second hot tinning treatment is carried out with a molten tin liquid having a temperature of 240° C. to 245° C., thereby preventing the tin already coated on the copper wire from re-melting excessively, meeting the requirements for the fluidity of the tin melt in the second tinning treatment, and reducing the energy consumption. Further, the temperature of the copper wire after the second tinning treatment is not too high, thereby avoiding yellowing phenomenon of the surface due to oxidation of the copper wire.

In the tinning process of copper wire, as the temperature of molten tin liquid increases, copper atoms diffuse into the molten tin liquid during the tinning process, which increases the viscosity of the molten tin liquid and reduces the wettability between the molten tin liquid and the copper wire. To further improve the wettability between the molten tin liquid and the copper wire, the temperature of the molten tin liquid needs to be further increased to overcome this problem. However when the temperature of the molten tin liquid exceeds 320° C., the tin layer on the copper wire will crystallize, and the quality of tinned copper wire cannot be guaranteed. Another technical solution is to replace the molten tin liquid, but this method cannot effectively use tin resources. In the process of the present application, the first hot tinning treatment is carried out at a first temperature of 270° C. to 320° C., and under this condition the molten tin liquid can be further used even after its copper concentration reaches 2 wt %, which concentration is much higher than the copper concentration, 1 wt % at maximum, in the molten tin liquid of the prior art, thereby avoiding the problem of replacing the molten tin liquid when its copper concentration exceeds 1 wt % in the prior art. The second hot tinning treatment is carried out with a molten tin liquid having a second temperature of 240° C. to 245° C., so that the molten tin liquid can be further used when its copper concentration reaches 0.7 wt %. When the copper concentration in the molten tin liquid is further increased, the molten tin liquid for the second hot tinning treatment can be transferred to the first hot tinning treatment, thereby improving the service life and utilization rate of the molten tin liquid. Furthermore, through the two tinning processes, during the second tinning, since the surface of the copper wire is already coated with a tin layer, and the second temperature is lower than the first temperature, the diffusion of copper atoms into the molten tin liquid is greatly reduced, and the service life of the molten tin liquid in the second tinning treatment is increased.

3. In a preferred embodiment of the present application, rare metals are added into the molten tin liquid during the second hot tinning treatment, which can improve the fluidity of the molten tin liquid, the wettability of the copper wire, and the oxidation resistance of the upper tin layer on the copper wire. Indium and bismuth can improve the fluidity and wettability of the molten tin liquid, and nickel can improve the oxidation resistance of the tin layer.

4. In a preferred embodiment of the present application, two tinning processes are adopted, which can increase the speed of conveying the copper wire and the production speed of the entire process. When compared with the prior art, the production speed of the production process is increased by 30-50%. Meanwhile, with the increase of the production speed, the contact time between the copper wire and the molten tin liquid can be shortened, so the diffusion of copper atoms into the molten tin liquid can be reduced, and the service life of the tin melt can be increased.

The fans are arranged parallel to the direction of the copper wire, and the wind direction is perpendicular to the copper wire, which can ensure that the cooling of each section of the copper wire is uniform during the second cooling process, and this method is relatively easy in control.

The distance between the fans and the mold is controlled, so that when the copper wire comes out from the mold, the copper wire can be cooled by air within this distance to solidify and form a tin layer, thus avoiding unevenness of the tin layer which may be caused due to the effect of the wind. If the distance between the fans and the mold is too long, the tin layer will remain in a high temperature for a longer time, which increases the risk of oxidation of the tin layer.

Adding 0.01-0.1 wt % of phosphorus into the molten tin liquid during the first hot tinning treatment can reduce the oxidation of the molten tin liquid, and further improve the wettability of the copper wire and the molten tin liquid, and meanwhile prevent the copper wire from oxidation between the two hot tinning processes.

5. In a preferred embodiment of the present application, controlling the cooling length of the copper wire during the first cooling can prevent oxidation of the tin layer on the copper wire due to excessively long cooling length. This is because the first hot tinning treatment is carried out at a first temperature of 270° C. to 320° C., relatively short cooling length of the copper wire can prevent the temperature of the copper wire from decreasing too low, and the temperature of the molten tin liquid during the second hot tinning treatment will not decrease too fast when the copper wire enters thereinto, so that the second hot tinning furnace can maintain a balanced temperature.

BRIEF DESCRIPTION OF THE DRAWINGS

In order to more clearly describe the specific embodiments of the present application or the technical solutions in the prior art, a brief description of the drawings required in the specific embodiments or descriptions of the prior art is given below. Obviously, the drawings described below are only some embodiments of the present application, and other drawings can be obtained by one of ordinary skill in the art according to the drawings in the present application without creative work.

FIG. 1 is a process for producing a tinned copper wire in embodiment 1 of the present application.

Reference numbers are as follows:
1—copper wire; 2—first hot tinning furnace; 3—second hot tinning furnace; 4—mold; 5—fans; 6—surface activation device; 7—zirconia ceramic guide wheel;
2-1—molten tin liquid during the first hot tinning treatment; and
3-1—molten tin liquid during the second hot tinning treatment.

DETAILED DESCRIPTION

It The present application is further described by referring to but not limit to the following embodiments. Any product that is the same as or similar to the present application obtained by anyone under the teaching of the present application or by combining with other features of the prior art falls within the protection scope of the present application.

Experimental steps or conditions not noted in the embodiments can be carried out according to the operation or the condition of the conventional experimental steps described in the art. The used reagents or instruments, for which the manufacturers are not noted, are all conventional reagent products which are commercially available.

Embodiment 1

Provided is a process for producing a tinned copper wire, as shown in FIG. 1, the steps of which are described as follows:

An annealed bare copper wire 1 having a diameter of 1.18 mm was selected, and conveyed at a speed of 180 m/min in a direction as indicated in FIG. 1 to start the process for tinning. Firstly, the copper wire was conveyed into a surface activation device 6 where activation treatment was carried out on the surface of the copper wire using $ZnCl2$ aqueous solution as a flux (purchased from Shenzhen Mingxinshun Technology Co., Ltd.). Then the copper wire was conveyed into a molten tin liquid 2-1 in a first hot tinning furnace 2 to receive a first hot tinning treatment. The copper wire was conveyed via a zirconia ceramic guide wheel 7, and there was no mold in the first hot tinning furnace. The molten tin liquid 2-1 had a temperature of 320° C. and comprised phosphorus in an amount of 0.1 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.5 m. Then the copper wire was conveyed into in a molten tin liquid 3-1 in a second hot tinning furnace 3 to receive a second hot tinning treatment. The molten tin liquid 3-1 had a temperature of 245° C. and comprised a rare metal in an amount of 0.08 wt % (the rare metal was composed of indium, bismuth, and nickel at a mass ratio of 1:1:1). In the second hot tinning furnace, the copper wire was conveyed via another zirconia ceramic guide wheel 7, and a mold 4 was provided at a position where the copper wire left the molten tin liquid. The mold was provided with a round through hole having a diameter of 1.2 mm. The copper wire was passed through the round through hole to leave the molten tin liquid in the second hot tinning furnace and enter a second cooling process. The second cooling was carried out by a wind cooling method. A number of fans 5 were provided and arrange to parallel to the conveying direction of the copper wire such that wind outlets of the fans are perpendicular to the copper wire and thus the wind direction was perpendicular to the copper wire. The wind speed was 15 m/s. The length of the copper wire blown by the wind was 1.2 m (length of the copper wire exposed to the second cooling). The most upstream fan in the conveying direction is disposed at a distance of 0.5 m (based on the length of the copper wire) from the mold. Finally, a tinned copper wire having a diameter of 1.2 mm was obtained, and was taken up for storage.

In the present embodiment, twelve zirconia ceramic guide wheels were provide in each of the first hot tinning furnace and the second hot tinning furnace, and twelve molds were provided in the second hot tinning furnace, and there are twelve wire taking-up devices, so that twelve production lines can run at the same time.

Embodiment 2

Provided is a process for producing a tinned copper wire, the steps of which are described as follows:

An annealed bare copper wire 1 having a diameter of 0.49 mm was selected, and conveyed at a speed of 260 m/min in a direction as indicated in FIG. 1 to start the process for tinning. Firstly, the copper wire was conveyed into a surface activation device where activation treatment was carried out on the surface of the copper wire using ZnCl2 aqueous solution as a flux. Then the copper wire was conveyed into a molten tin liquid in a first hot tinning furnace to receive a first hot tinning treatment. The copper wire was conveyed via a zirconia ceramic guide wheel, and there was no mold in the first hot tinning furnace. The molten tin liquid had a temperature of 280° C. and comprised phosphorus in an amount of 0.08 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.5 m. Then the copper wire was conveyed into in a molten tin liquid in a second hot tinning furnace to receive a second hot tinning treatment. The molten tin liquid had a temperature of 242° C. and comprised a rare metal in an amount of 0.08 wt % (the rare metal was composed of indium, bismuth, and nickel at a mass ratio of 1:1:2). In the second hot tinning furnace, the copper wire was conveyed via another zirconia ceramic guide wheel, and a mold was provided at a position where the copper wire left the molten tin liquid. The mold was provided with a round through hole having a diameter of 0.5 mm. The copper wire was passed through the round through hole to leave the molten tin liquid in the second hot tinning furnace and enter a second cooling process. The second cooling was carried out by a wind cooling method. A number of fans were provided and arrange to parallel to the conveying direction of the copper wire such that wind outlets of the fans are perpendicular to the copper wire and thus the wind direction was perpendicular to the copper wire. The wind speed was 15 m/s. The length of the copper wire blown by the wind was 1 m (length of the copper wire exposed to the second cooling). The most upstream fan in the conveying direction is disposed at a distance of 0.5 m (based on the length of the copper wire) from the mold. Finally, a tinned copper wire having a diameter of 0.5 mm was obtained, and was taken up for storage.

In the present embodiment, sixteen production lines can run at the same time.

Embodiment 3

Provided is a process for producing a tinned copper wire, the steps of which are described as follows:

An annealed bare copper wire 1 having a diameter of 0.074 mm was selected, and conveyed at a speed of 350 m/min in a direction as indicated in FIG. 1 to start the process for tinning. Firstly, the copper wire was conveyed into a surface activation device where activation treatment was carried out on the surface of the copper wire using ZnCl2 aqueous solution as a flux. Then the copper wire was conveyed into a molten tin liquid in a first hot tinning furnace to receive a first hot tinning treatment. The copper wire was conveyed via a zirconia ceramic guide wheel, and there was no mold in the first hot tinning furnace. The molten tin liquid had a temperature of 270° C. and comprised phosphorus in an amount of 0.1 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.2 m. Then the copper wire was conveyed into in a molten tin liquid in a second hot tinning furnace to receive a second hot tinning treatment. The molten tin liquid had a temperature of 240° C. and comprised a rare metal in an amount of 0.05 wt % (the rare metal was composed of indium, bismuth, and nickel at a mass ratio of 1:1:2). In the second hot tinning furnace, the copper wire was conveyed via another zirconia ceramic guide wheel, and a mold was provided at a position where the copper wire left the molten tin liquid. The mold was provided with a round through hole having a diameter of 0.08 mm. The copper wire was passed through the round through hole to leave the molten tin liquid in the second hot tinning furnace and enter a second cooling process. The second cooling was carried out by a wind cooling method. A number of fans were provided and arrange to parallel to the conveying direction of the copper wire such that wind outlets of the fans are perpendicular to the copper wire and thus the wind direction was perpendicular to the copper wire. The wind speed was 15 m/s. The length of the copper wire blown by the wind was 0.85 m (length of the copper wire exposed to the second cooling). The most upstream fan in the conveying direction is disposed at a distance of 0.5 m (based on the length of the copper wire) from the mold. Finally, a tinned copper wire having a diameter of 0.08 mm was obtained, and was taken up for storage.

In the present embodiment, twenty-four production lines can run at the same time.

Embodiment 4

Provided is a process for producing a tinned copper wire, the steps of which are described as follows:

An annealed bare copper wire 1 having a diameter of 1.18 mm was selected, and conveyed at a speed of 180 m/min in a direction as indicated in FIG. 1 to start the process for tinning. Firstly, the copper wire was conveyed into a surface activation device 6 where activation treatment was carried out on the surface of the copper wire using ZnCl2 aqueous solution as a flux. Then the copper wire was conveyed into a molten tin liquid 2-1 in a first hot tinning furnace 2 to receive a first hot tinning treatment. The copper wire was conveyed via a zirconia ceramic guide wheel 7, and there was no mold in the first hot tinning furnace. The molten tin liquid 2-1 had a temperature of 300° C. and comprised phosphorus in an amount of 0.1 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.5 m. Then the copper wire was conveyed into in a molten tin liquid 3-1 in a second hot tinning furnace 3 to receive a second hot tinning treatment. The molten tin liquid 3-1 had a temperature of 270° C. and comprised a rare metal in an amount of 0.08 wt % (the rare metal was composed of indium, bismuth, and nickel at a mass ratio of 1:1:1). In the second hot tinning furnace, the copper wire was conveyed via another zirconia ceramic guide wheel 7, and a mold 4 was provided at a position where the copper wire left the molten tin liquid. The mold was provided with a round through hole having a diameter of 1.2 mm. The copper wire was passed through the round through hole to leave the molten tin liquid in the second hot tinning furnace and enter a second cooling process. The second cooling was carried out by a wind cooling method. A number of fans 5 were provided and arrange to parallel to the conveying direction of the copper wire such that wind outlets of the fans are perpendicular to the copper wire and thus the wind direction was perpendicular to the copper wire. The wind speed was 15 m/s. The length of the copper wire blown by the wind was 1.2 m (length of the copper wire exposed to the second cooling). The most upstream fan in the conveying direction is disposed at a distance of 0.5 m (based on the length of the copper wire) from the mold. Finally, a tinned copper wire having a diameter of 1.2 mm was obtained, and was taken up for storage.

In the present embodiment, twelve zirconia ceramic guide wheels were provide in each of the first hot tinning furnace and the second hot tinning furnace, and twelve molds were provided in the second hot tinning furnace, and there are twelve wire taking-up devices, so that twelve production lines can run at the same time.

Embodiment 5

Provided is a process for producing a tinned copper wire, the steps of which are described as follows:

An annealed bare copper wire 1 having a diameter of 0.49 mm was selected, and conveyed at a speed of 260 m/min in a direction as indicated in FIG. 1 to start the process for tinning. Firstly, the copper wire was conveyed into a surface activation device where activation treatment was carried out on the surface of the copper wire using ZnCl2 aqueous solution as a flux. Then the copper wire was conveyed into a molten tin liquid in a first hot tinning furnace to receive a first hot tinning treatment. The copper wire was conveyed via a zirconia ceramic guide wheel, and there was no mold in the first hot tinning furnace. The molten tin liquid had a temperature of 280° C. and comprised phosphorus in an amount of 0.08 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.5 m. Then the copper wire was conveyed into in a molten tin liquid in a second hot tinning furnace to receive a second hot tinning treatment. The molten tin liquid had a temperature of 242° C. and comprised a rare metal in an amount of 0.08 wt % (the rare metal was composed of indium and bismuth at a mass ratio of 1:1). In the second hot tinning furnace, the copper wire was conveyed via another zirconia ceramic guide wheel, and a mold was provided at a position where the copper wire left the molten tin liquid. The mold was provided with a round through hole having a diameter of 0.5 mm. The copper wire was passed through the round through hole to leave the molten tin liquid in the second hot tinning furnace and enter a second cooling process. The second cooling was carried out by a wind cooling method. A number of fans were provided and arrange to parallel to the conveying direction of the copper wire such that wind outlets of the fans are perpendicular to the copper wire and thus the wind direction was perpendicular to the copper wire. The wind speed was 15 m/s. The length of the copper wire blown by the wind was 1 m (length of the copper wire exposed to the second cooling). The most upstream fan in the conveying direction is disposed at a distance of 0.5 m (based on the length of the copper wire) from the mold. Finally, a tinned copper wire having a diameter of 0.5 mm was obtained, and was taken up for storage.

In the present embodiment, sixteen production lines can run at the same time.

Embodiment 6

Provided is a process for producing a tinned copper wire, the steps of which are described as follows:

An annealed bare copper wire 1 having a diameter of 0.49 mm was selected, and conveyed at a speed of 260 m/min in a direction as indicated in FIG. 1 to start the process for tinning. Firstly, the copper wire was conveyed into a surface activation device where activation treatment was carried out on the surface of the copper wire using ZnCl2 aqueous solution as a flux. Then the copper wire was conveyed into a molten tin liquid in a first hot tinning furnace to receive a first hot tinning treatment. The copper wire was conveyed via a zirconia ceramic guide wheel, and there was no mold in the first hot tinning furnace. The molten tin liquid had a temperature of 280° C. and comprised phosphorus in an amount of 0.08 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.5 m. Then the copper wire was conveyed into in a molten tin liquid in a second hot tinning furnace to receive a second hot tinning treatment. The molten tin liquid had a temperature of 242° C. and comprised a rare metal in an amount of 0.05 wt % (the rare metal was bismuth). In the second hot tinning furnace, the copper wire was conveyed via another zirconia ceramic guide wheel, and a mold was provided at a position where the copper wire left the molten tin liquid. The mold was provided with a round through hole having a diameter of 0.5 mm. The copper wire was passed through the round through hole to leave the molten tin liquid in the second hot tinning furnace and enter a second cooling process. The second cooling was carried out by a wind cooling method. A number of fans were provided and arrange to parallel to the conveying direction of the copper wire such that wind outlets of the fans are perpendicular to the copper wire and thus the wind direction was perpendicular to the copper wire. The wind speed was 12 m/s. The length of the copper wire blown by the wind was 1 m (length of the copper wire exposed to the second cooling). The most upstream fan in the conveying direction is disposed at a distance of 0.5 m (based on the length of the copper wire) from the mold. Finally, a tinned copper wire having a diameter of 0.5 mm was obtained, and was taken up for storage.

In the present embodiment, sixteen production lines can run at the same time.

Comparative Example 1

Provided is a process for producing a tinned copper wire, the steps of which are described as follows:

An annealed bare copper wire 1 having a diameter of 0.49 mm was selected, and conveyed at a speed of 260 m/min in a direction as indicated in FIG. 1 to start the process for tinning. Firstly, the copper wire was conveyed into a surface activation device where activation treatment was carried out on the surface of the copper wire using ZnCl2 aqueous solution as a flux. Then the copper wire was conveyed into a molten tin liquid in a first hot tinning furnace to receive a first hot tinning treatment. The copper wire was conveyed via a zirconia ceramic guide wheel, and there was no mold in the first hot tinning furnace. The molten tin liquid had a temperature of 280° C. and comprised phosphorus in an amount of 0.08 wt %. Then the copper wire was conveyed out of the molten tin liquid in the first hot tinning furnace and exposed in natural air to undergo a first cooling by the natural air outside the furnace. During the first cooling a cooling length of the copper wire in the natural air is 1.5 m. Then the copper wire was conveyed into in a molten tin liquid in a second hot tinning furnace to receive a second hot tinning treatment. The molten tin liquid had a temperature of 280° C. and comprised a rare metal in an amount of 0.08 wt % (the rare metal was composed of indium, bismuth, and nickel). In the second hot tinning furnace, the copper wire was conveyed via another zirconia ceramic guide wheel, and a mold was provided at a position where the copper wire left the molten tin liquid. The mold was provided with a round through hole having a diameter of 0.5 mm. The copper wire was passed through the round through hole to leave the molten tin liquid in the second hot tinning furnace and enter a second cooling process. The second cooling was carried out by a wind cooling method. A number of fans were provided and arrange to parallel to the conveying direction of the copper wire such that wind outlets of the fans are perpendicular to the copper wire and thus the wind direction was perpendicular to the copper wire. The wind speed was 15 m/s. The length of the copper wire blown by the wind was 1 m (length of the copper wire exposed to the second cooling). The most upstream fan in the conveying direction is disposed at a distance of 0.5 m (based on the length of the copper wire) from the mold. Finally, a tinned copper wire having a diameter of 0.5 mm was obtained, and was taken up for storage Test Example This test example provides performance test methods and results of the tinned copper wires prepared in embodiments 1-6 and comparative example 1.

The diameter, surface quality, heat resistance, salt spray resistance and the thickness of tin layer on tinned copper wire are tested according to GBT4910-2009; and the test results are shown in the following table.

| No. | Diameter (mm) | Deviation of diameter | Quality of the surface of the tin layer | Heat resistance | Thickness of tin layer (μm) | Salt spray resistance |
|---|---|---|---|---|---|---|
| Embodiment 1 | 1.198 | ±0.002 | The surface is smooth and continuous, without defects. | The surface of tin layer is free of yellow color, uncoated holes, molten tin, and tin coating shedding. | 9 | The surface is smooth, free of black or yellow phenomenon. |
| Embodiment 2 | 0.501 | ±0.002 | The surface is smooth and continuous, without defects. | The surface of tin layer is free of yellow color, uncoated holes, molten tin, and tin coating shedding. | 5.5 | The surface is free of black or yellow phenomenon. |
| Embodiment 3 | 0.081 | ±0.002 | The surface is smooth and continuous, without defects. | The surface of tin layer is free of yellow color, uncoated holes, molten tin, and tin coating shedding. | 3.5 | The surface is free of black or yellow phenomenon. |
| Embodiment 4 | 1.191 | ±0.003 | The surface is not smooth enough. | The surface of tin layer is free of yellow color, uncoated holes, molten tin, and tin coating shedding. | 5.5 | The surface is free of black or yellow phenomenon. |
| Embodiment 5 | 0.500 | ±0.001 | The surface is smooth and continuous, without defects. | The surface of tin layer is slightly dark, free of uncoated holes, molten tin, and tin coating shedding. | 5.0 | The surface is free of black or yellow phenomenon. |
| Embodiment 6 | 0.500 | ±0.001 | The surface is smooth and continuous, without defects. | The surface of tin layer is slightly dark, free of uncoated holes, molten tin, and tin coating shedding. | 5.0 | The surface is slightly black. |
| Comparative example 1 | 0.498 | ±0.003 | The surface is not smooth enough. | The surface of tin layer is free of yellow color, but has a small amount of uncoated holes and tin coating shedding. | 4 | The surface is slightly black. |

The tinned copper wires produced by the process of the present application have better heat resistance and salt spray resistance, the tin layer on the copper wire has a uniform thickness and continuous smooth surface, and the deviation of diameter is small. Meanwhile, the speed of conveying the copper wire is fast during this production process, and multiple production lines can run at the same time, so the production efficiency is much higher than other existing production methods of the same specification. In addition, the molten tin liquid during the hot tinning process has a long service life, the tin consumption is greatly reduced, and the utilization rate of tin is improved.

In addition, the tin layer on the tinned copper wire obtained by the production process can reach a thickness up to 9 micrometers (μm), which is surprising because the thickness of the tin layer obtained by the existing hot tinning processes cannot be greater than 6 μm.

Apparently, the aforementioned embodiments are merely examples illustrated for clearly describing the present application, rather than limiting the implementation ways thereof. For those skilled in the art, various changes and modifications in other different forms can be made on the basis of the aforementioned description. The implementation ways are not described exhaustively. Any obvious changes or modifications derived from the aforementioned description are intended to be embraced within the protection scope of the present application.

What is claimed is:

1. A process for producing a tinned copper wire, comprising:
   subjecting a copper wire sequentially to activation treatment, a first hot tinning treatment, a first cooling, a second hot tinning treatment, and a second cooling to obtain a tinned copper wire,
   wherein:
      the first hot tinning treatment is carried out in a first molten tin liquid at a first temperature;
      the second hot tinning treatment is carried out in a second molten tin liquid at a second temperature;
      the first temperature is higher than the second temperature;
      the first temperature is at least 38° C. higher than the melting point of tin; and
      the second temperature is at least 8° C. higher than the melting point of tin;
      wherein the first temperature is 320° C., and wherein the second temperature is 245° C.;
      the second molten tin liquid for the second hot tinning treatment comprises a rare metal in an amount of 0.08 wt %, and the rare metal is composed of indium, bismuth and nickel at a mass ratio of 1:1:1;
      the first hot tinning treatment is carried out with the first molten tin liquid comprising copper contamination from the copper wire in an amount of zero wt % to 2.0 wt %, and wherein the second hot tinning treatment is carried out with the second molten tin liquid comprising copper contamination from the copper wire in an amount of zero wt % to 0.7 wt %
      the first molten tin liquid for the first hot tinning treatment comprises phosphorus in an amount of 0.1 wt %.

2. The process of claim 1 wherein the second cooling is carried out by a wind cooling method, at a wind speed of 10-15 meters per second with a wind direction that is perpendicular to the copper wire.

3. The process of claim 1 wherein the copper wire is conveyed at a speed of 150-400 meters per minute during the process.

4. The process of claim 3 wherein the copper wire is conveyed at a speed of 150-200 meters per minute when the copper wire has a diameter of greater than 0.8 millimeters (mm), or 300-400 meters per minute when the copper wire has a diameter of less than 0.1 mm, or 200-300 meters per minute when the copper wire has a diameter of 0.1-0.8 mm.

5. The process of claim 1 wherein a cooling length of the copper wire in the first cooling is 1.0-1.5 meters.

6. The process of claim 1 wherein the first hot tinning treatment is performed in a first hot tinning furnace containing the first molten tin liquid, wherein the second hot tinning treatment is performed in a second hot tinning furnace containing the second molten tin liquid, and wherein the process further comprises transferring the second molten tin liquid from the second hot tinning furnace to the first hot tinning furnace when concentration of copper contamination from the copper wire in the second molten tin liquid reaches a predetermined threshold.

* * * * *